United States Patent
Fukuoka

(10) Patent No.: US 8,316,268 B2
(45) Date of Patent: Nov. 20, 2012

(54) DATA TRANSMISSION APPARATUS CONTROLLING DATA RETRANSMISSION AND DATA TRANSMISSION METHOD CONTROLLING DATA RETRANSMISSION

(75) Inventor: Tomomi Fukuoka, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 638 days.

(21) Appl. No.: 12/468,311

(22) Filed: May 19, 2009

(65) Prior Publication Data

US 2009/0300459 A1    Dec. 3, 2009

(30) Foreign Application Priority Data

May 29, 2008  (JP) ................................ 2008-141082

(51) Int. Cl.
*H04L 1/18* (2006.01)
(52) U.S. Cl. ........................................ 714/748; 714/776
(58) Field of Classification Search .................. 714/776, 714/748; 375/240.27
See application file for complete search history.

(56) References Cited

U.S. PATENT DOCUMENTS

| 7,864,814 | B2 * | 1/2011 | Johansson et al. ............. 370/508 |
| 2002/0131510 | A1 * | 9/2002 | Lin ........................... 375/240.27 |
| 2005/0044471 | A1 * | 2/2005 | Chia et al. ...................... 714/776 |
| 2006/0291468 | A1 * | 12/2006 | Bopardikar et al. .......... 370/392 |
| 2007/0033496 | A1 | 2/2007 | Cooklev |
| 2007/0198254 | A1 * | 8/2007 | Goto et al. .................... 704/226 |
| 2009/0213940 | A1 * | 8/2009 | Steinbach et al. ........ 375/240.27 |

FOREIGN PATENT DOCUMENTS

| JP | 2005-518162 A | 6/2005 |
| JP | 2005-526422 A | 9/2005 |
| JP | 2006-304138 A | 11/2006 |
| JP | 2007-28623 | 2/2007 |

* cited by examiner

*Primary Examiner* — Esaw Abraham
(74) *Attorney, Agent, or Firm* — Canon USA Inc. IP Division

(57) ABSTRACT

A transmission apparatus receives information used to identify data unsuccessfully received by a reception apparatus. Then, the transmission apparatus determines whether the data corresponding to the received identification information should be retransmitted based on whether the reception apparatus has a function of displaying the display area of the data corresponding to the identification information by using data having the display area corresponding to the data corresponding to the identification information.

14 Claims, 6 Drawing Sheets

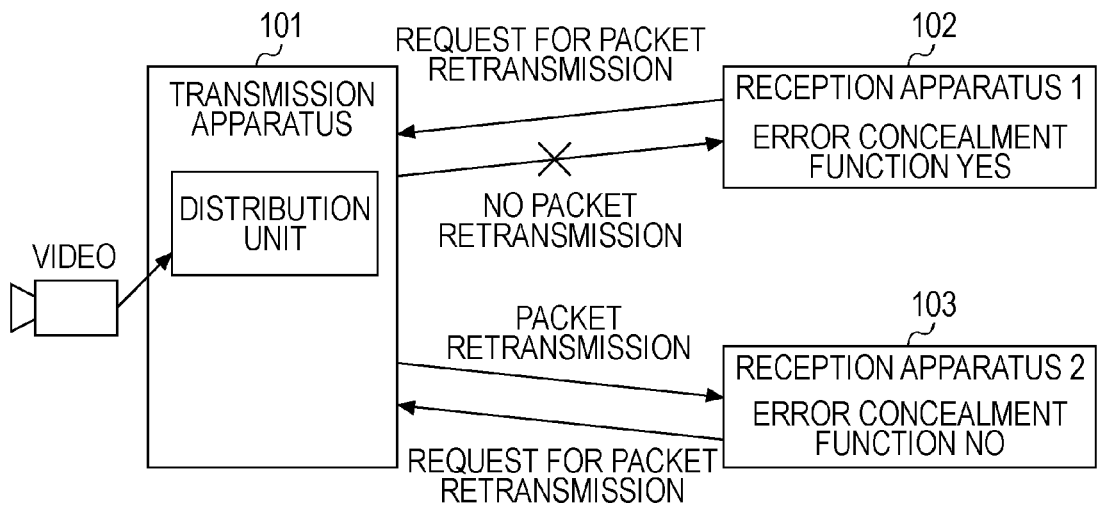
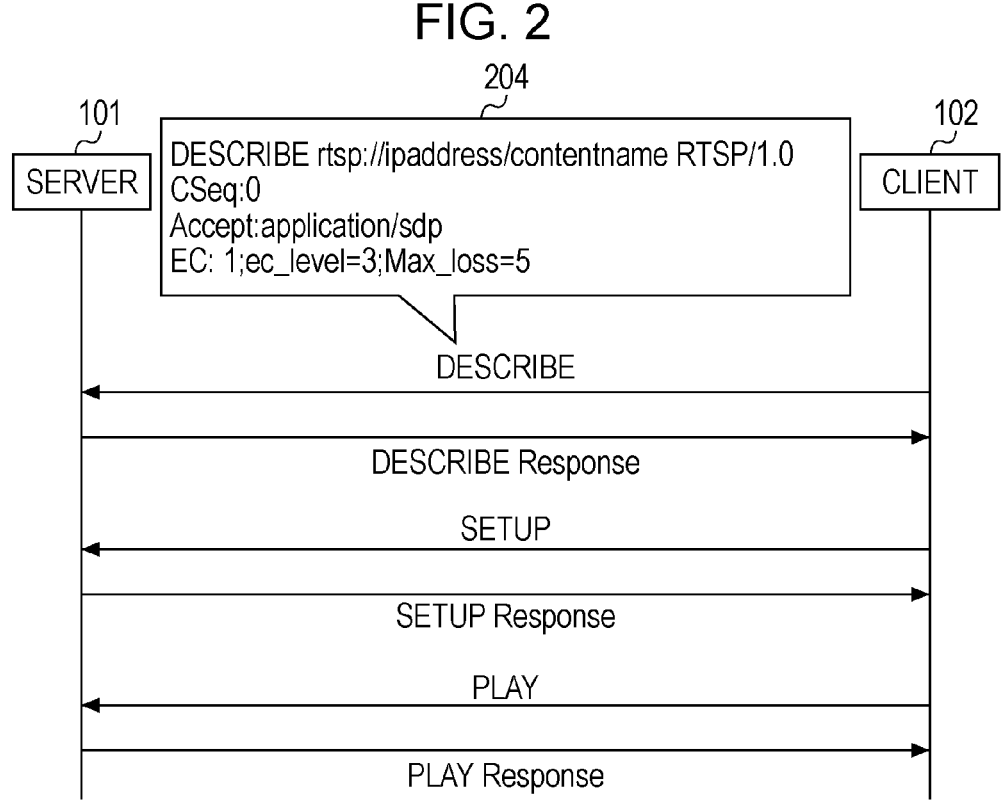

FIG. 3

| SSRC | |
|---|---|
| PACKET DISCARD RATE | ACCUMULATED PACKET DISCARD RATE |
| 32-BIT EXPANSION ORDER NUMBER OF LAST TRANSMITTED PACKET | |
| FLUCTUATIONS IN PACKET ARRIVAL INTERVALS | |
| NTP TIME STAMP OF LAST TRANSMITTED SenderReport PACKET (LSR) | |
| DLSR | |

FIG. 5
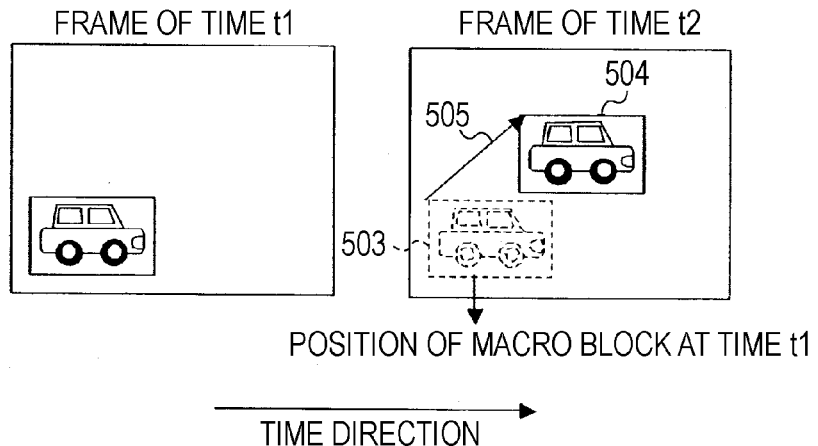
FIG. 6
| MB1 | MB2 | MB3 |
| --- | --- | --- |
| MB4 | MB5 | MB6 |
| MB7 | MB8 | MB9 |
FIG. 7
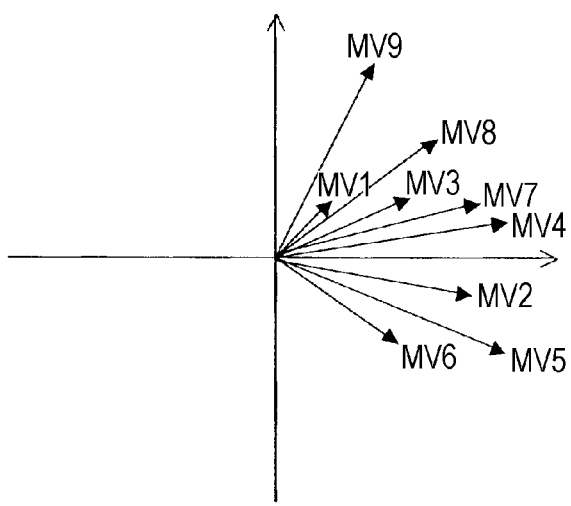

DATA TRANSMISSION APPARATUS CONTROLLING DATA RETRANSMISSION AND DATA TRANSMISSION METHOD CONTROLLING DATA RETRANSMISSION

BACKGROUND OF THE INVENTION

1. Field of the Invention

The present invention relates to a technology used to retain the quality of data communication services including video streaming or the like.

2. Description of the Related Art

In the past, retransmission control, rate control, forward error correction (FEC) denoting an error correction technology, error concealment (EC) denoting an error concealment technology, and so forth have been widely known, as technologies achieved for QoS (the quality of communication services) control performed through end-use apparatuses including a transmission apparatus and a reception device that are used for the video streaming.

Each of the above-described technologies has been contemplated in various quarters. There are known technologies for adding sophisticated control performed considering the congestion state of the network band.

Thus, when a video streaming system is considered, the following rate control technology is used. Namely, even though video is transmitted while avoiding errors occurring on the video-data distribution side at the video-data transmission time, a technology for recovering from errors by retransmitting a lost packet, for example, is used. Further, a method of performing multiple controls has been contemplated, so as to add a technology of concealing errors fixed on the video-streaming-reception side with difficulty. Still further, when various types of error resistance technologies can be controlled at the video-streaming-transmission time and expected operations are executed, it is predicted that the QoS control can be performed for high-quality video streaming transmission with a high probability.

Japanese Patent Laid-Open No. 2007-28623 discloses the technology for adding a retry flag to a packet, the retry flag indicating that a system on the reception side should not try to perform the packet retransmission when an error is predicted in the packet.

However, even though the QoS control is thoroughly performed at each of points including the video-streaming transmission side, the video-streaming reception side, or a band therebetween, the most appropriate result is not necessarily obtained. This is because when error resistance processing is performed at each point, the QoS resource is used at each point, which increases the load on the QoS resource in the system as a whole. Therefore, even though no trouble occurs when a single streaming video data item is distributed, troubles may occur when a person distributes a plurality of streaming video data items. Further, when a plurality of streaming video data items is transmitted by a plurality of users via a network line and a plurality of applications is used in a personal computer (PC) terminal of a person, troubles may occur in different streaming video and/or applications. Particularly, since the retransmission of streaming video is performed for packet losses occurring when packets are transmitted through a narrow band and when the band is congested, the state of the band may be deteriorated due to the streaming-video retransmission.

Further, according to the technology disclosed in Japanese Patent Laid-Open No. 2007-28623, no consideration is given to the multiple-control method including the error correction technology and the error concealment technology.

SUMMARY OF THE INVENTION

The present invention allows for distributing control loads so as maintain the quality of communication services. The present invention further allows for avoiding the deterioration of a communication band, which occurs due to the data retransmission.

According to an aspect of the present invention, a transmission apparatus transmitting data to a reception apparatus is provided, the transmission apparatus including a receiving unit configured to receive information used to identify the first data unsuccessfully received by the reception apparatus, and a determining unit configured to determine whether the first data corresponding to the identification information should be retransmitted based on whether the reception apparatus has a function of displaying a display area of the first data by using the second data having a display area corresponding to the first data.

Further features of the present invention will become apparent from the following description of exemplary embodiments with reference to the attached drawings.

BRIEF DESCRIPTION OF THE DRAWINGS

FIG. 1 is a diagram schematically showing a system configuration according to an embodiment of the present invention.

FIG. 2 is a diagram illustrating an error-concealment-function notification method.

FIG. 3 is a conceptual illustration of the configuration of a reception report block included in the RR packet of an RTCP response.

FIG. 5 is a diagram illustrating the motion vector of a macro block.

FIG. 6 is a diagram illustrating the weight of the motion vector.

FIG. 7 is a diagram illustrating the weights of the motion vectors.

DESCRIPTION OF THE EMBODIMENTS

Figure 4:
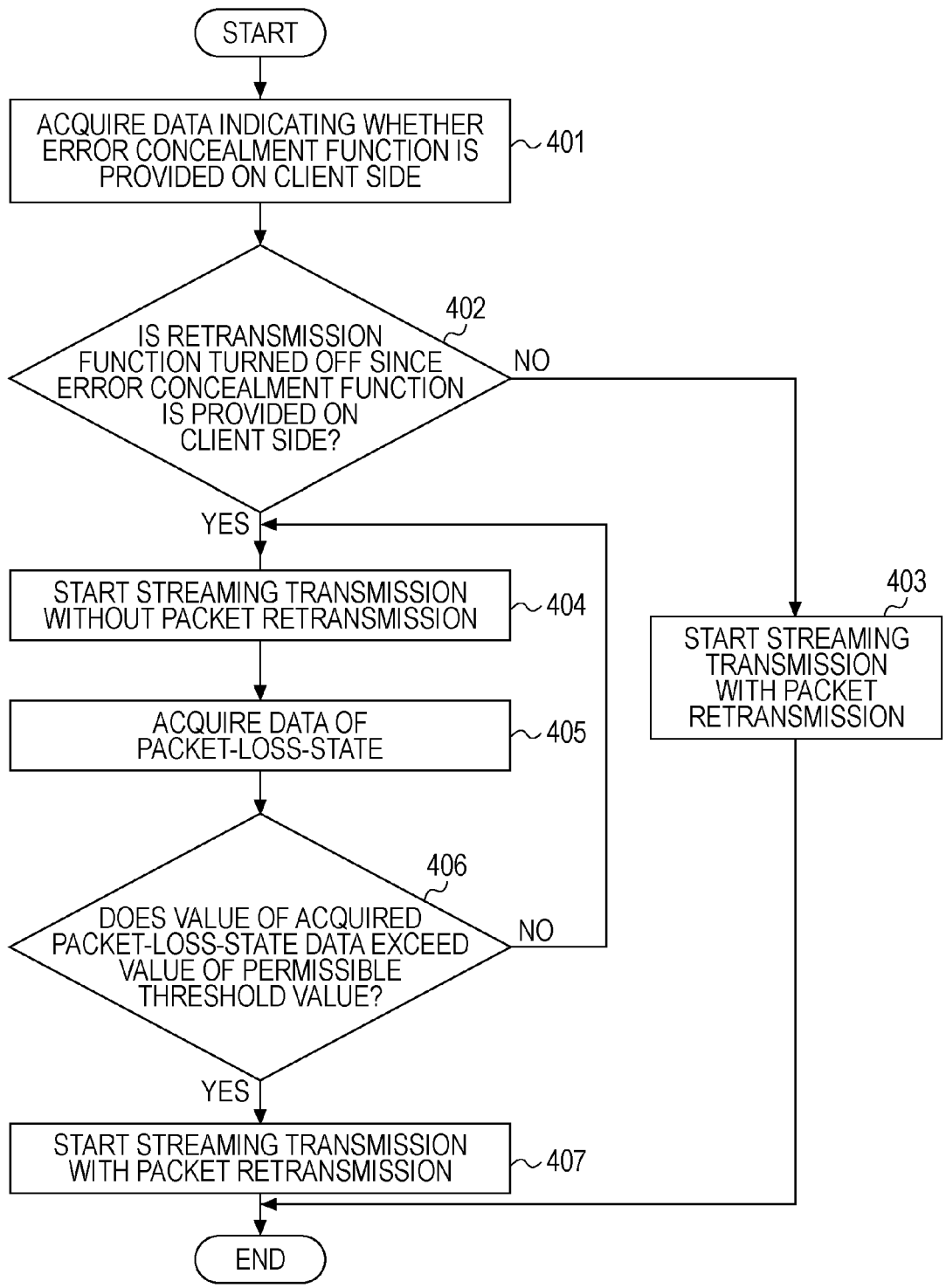
FIG. 4 is a flowchart showing the flow of operations performed by a server.

Hereinafter, embodiments of the present invention will be described in detail with reference to the attached drawings.

A first embodiment of the present invention will be described. FIG. 1 is a diagram schematically showing a system configuration according to the first embodiment. For other embodiments which will be described later, the system configuration shown in FIG. 1 can be used.

As shown in FIG. 1, a system according to the first embodiment is configured to transmit streaming video from a transmission apparatus 101 to reception apparatuses 102 and 103. When a request to retransmit a packet is transmitted from each of the reception apparatuses 102 and 103 to the transmission apparatus 101, information indicating whether each of the reception apparatuses 102 and 103 is provided with an error-concealment (hereinafter referred to as EC) function is transmitted to the transmission apparatus 101. Here, the relationship between the transmission apparatus 101, and the reception apparatuses 102 and 103 corresponds to that between a server and clients. In the following description, the transmission apparatus 101 is referred to as a server 101, and the reception apparatuses 102 and 103 are referred to as clients 102 and 103. A data reception apparatus according to an embodiment of the present invention is used for each of the reception apparatuses 102 and 103, and a data transmission apparatus according to an embodiment of the present invention is used for the transmission apparatus 101.

The server 101 retransmits a packet to the client 103 having no EC function through a distribution unit, and retransmits no packet to the client 102 having the EC function. In the above-described embodiment, the above-described control is determined to be basic control. When the client 102 is provided with the EC function as described above, control is performed so that the QoS function of the client 102 is used and a retransmission function between the server 101 and the client 102 is not used. Consequently, the distribution of loads on the QoS resources can be achieved.

According to an exemplary method of transmitting information indicating whether each of the clients 102 and 103 is provided with the EC function, header information provided to transfer information whether the EC function is provided is embedded in a real-time-streaming-protocol (RTSP) request transmitted from each of the clients 102 and 103 as indicated by data 204 shown in FIG. 2. The data 204 is exemplarily provided as information about the RTSP request transmitted from each of the clients 102 and 103 to the server 101. Information indicated by the value EC:1 shown on the last line of the RTSP request is the information for transfer, which indicates whether the EC function is provided. The existence of the EC function is indicated by the sign 1 and the non-existence of the EC function is indicated by the sign 0 so that the server 101 can determine whether the client is provided with the EC function.

In the case where the above-described basic control is performed, it is uniquely determined that no packet is retransmitted when the client is provided with the EC function. However, the dependence on the above-described method alone may significantly decrease the video quality due to the range of the impact of the packet loss amount and/or lost packets on subsequent frames (the impact range). If the above-described significant decrease in the image quality is predicted, the packet retransmission is performed based on a determination made by the server 101 in addition to the above-described basic control. Namely, if the client 102 is provided with the EC function and it is predicted that the EC function is ineffective, the server 101 performs control in real time so that the packet retransmission is permitted by way of exception.

In the above-described embodiment, detailed information indicating the method of performing the EC function and/or information about numerical values, that is, various types of threshold values provided to recover from errors by using the above-described method is added to the above-described information indicating whether the EC function is provided, and transmitted from the client to the server 101, so as to perform the above-described control. More specifically, the detailed information indicating the method of performing the EC function and/or the information about the various types of threshold values provided to recover from errors by using the method is written on a character string following the above-described information EC:1 indicating whether the EC function is provided, which is shown on the last line of the data 204 shown in FIG. 2. For example, an RTSP request including data described as ec_level=3 is transmitted from the client 102 to the server 101. The data described as ec_level=3 indicates that a packet rated as at least 3 on the importance scale of 1 to 5 is retransmitted. Through the addition of the detailed information to the information indicating whether the EC function is provided, the server 101 can perceive not only the information whether each of the clients 102 and 103 has the EC function but also detailed effects of the EC function of each of the clients 102 and 103.

If it is predicted that the EC function is ineffective, determinations may be made according to various methods. In the above-described embodiment, the criterion on which to determine, by the server 101, whether the packet retransmission should be performed by way of exception is exemplarily determined based on the number of error packets (lost packets) transmitted between the server 101 and each of the clients 102 and 103. A method performed by using the RTCP (RTP Control Protocol) request may be used, so as to detect the number of the error packets.

FIG. 3 is a conceptual illustration of the configuration of a reception report block 301 included in a receiver report (RR) packet of the RTCP request. As shown in FIG. 3, information indicating the reception state of each of the streams transmitted to the clients 102 and 103 (the packet discard rate, jitter, and so forth) is written in the reception report block 301. The server 101 can determine how many packet losses occur by acquiring information included in the reception report block 301. Although each of the clients 102 and 103 is provided with the EC function, the server 101 performs the packet retransmission based on the number of the packet losses. Further, the server 101 can perceive how many packets are lost by confirming the sequence numbers of the packets on the client-102-and-103 side.

The threshold values compared with the number of the lost packets, so as to determine whether the EC function would be ineffective, may be set to the server 101 for each application. Further, threshold values varying among the EC function methods may be minutely determined in the above-described RTSP request on the server-101 side. Consequently, it becomes possible to control the permissible range of the number of packet losses based on the EC function method.

The minutely determined threshold value will be described with reference to FIG. 2. Namely, the threshold value corresponds to a character string following the information EC:1 indicating whether the EC function is provided and the information ec_level=3 indicating the importance permissible level that are shown on the last line of the data 204. The character string is described as Max_loss=5 and data of the character string is transmitted from the client 102 to the server 101 so that when the packet loss rate exceeds 5%, the server 101 performs the packet retransmission. In another case, the packet retransmission is performed when five consecutive packets are lost, for example. A method of running tests on numerical values in advance and determining the most appropriate numerical value can be considered, for example, as the method of determining the above-described specific numerical values. For example, a tolerable numerical value is determined by simulatively generating an error packet and visually checking the effect of the EC function.

Next, operations of the server 101 will be described in detail with reference to a flowchart shown in FIG. 4.

First, the server 101 acquires information indicating whether the client is provided with the EC function, the information being added to a message DESCRIBE of the RTSP request, when the client 102 and/or the client 103 accesses the server 101 at step S401. Then, if it is determined that the EC function is provided based on the acquired information indicating whether the EC function is provided, the server 101 determines whether the retransmission function should be turned off at step S402. If it is determined that the retransmission function should not be turned off at step S402, the server 101 performs streaming transmission with the packet retransmission at step S403. On the other hand, if it is determined that the retransmission function should be turned off at step S402, the server 101 performs the streaming transmission without the packet retransmission at step S404. Here, the processing performed at step S402 is exemplary processing performed through a determining unit of a data transmission apparatus according to an embodiment of the present invention.

Next, the server 101 acquires information about the state of the packet losses, the information being added to the RR packet of the RTCP request at step S405. As described above, each of the clients 102 and 103 confirms the sequence number of the RTP packet and the server 101 acquires information about the confirmation result so that the state of the packet losses can be perceived.

Next, the server 101 determines whether the number of the error packets, where information about the number is acquired at step S405, exceeds a predetermined threshold value at step S406. If the determination result obtained at step S406 indicates that the error packet number does not exceed the threshold value, the processing returns to step S404 and the server 101 continues transmitting the streaming video without the packet retransmission. On the other hand, if the determination result obtained at step S406 indicates that the error packet number exceeds the threshold value, the server 101 starts transmitting the streaming video with the packet retransmission at step S407.

Hereinafter, the server 101 continues transmitting the streaming video while performing the packet retransmission, acquires the RR packet of the RTCP request, the RR packet being regularly transmitted from each of the clients 102 and 103, and checks the sequence number of the RTP packet. Then, the server 101 determines whether the number of the lost packets exceeds the predetermined threshold value repeatedly, so as to control the streaming transmission based on the state of the number of the lost packets at all times. Here, information about a finish event is transmitted from each of the clients 102 and 103 to the server 101, whereby the processing is finished. The processing performed at step S407 is exemplary processing performed by a transmission unit according to an embodiment of the present invention.

Next, a second embodiment of the present invention will be described. In the above-described first embodiment, it is determined whether the number of the packet losses exceeds the threshold value as the determination method used when it is predicted that the EC function of each of the clients 102 and 103 is ineffective. On the other hand, a determination method used when it is predicted that the other EC functions are ineffective will be described in the second embodiment.

In the above-described embodiment, the server 101 determines an important motion vector in advance. If a packet including the above-described motion vector is lost, the server 101 retransmits the packet. In the above-described embodiment, a macro block (hereinafter abbreviated as an MB) is situated in an area 503 at time t1 as shown in FIG. 5. However, the MB moves to the position of an area 504 at time t2. In the above-described embodiment, a motion vector 505 indicating the moving amount of the MB is determined in advance. If a packet including the motion vector 505 is lost, the packet retransmission is performed.

More specifically, a motion vector considered as an influential motion vector when being lost is extracted in advance from motion vectors shown in a frame, and data of the above-described motion vector is stored. Then, if each of the clients 102 and 103 notifies the server 101 that a packet including the motion vector is lost, the server 101 retransmits the corresponding packet. Further, other than the method of extracting and determining the motion vector in advance, the following method may be considered. Namely, data of a weight may be added to each of various motion vectors. If the value of weight of the motion vector of a lost packet exceeds a predetermined threshold value, the corresponding packet may be retransmitted.

Figure 8:
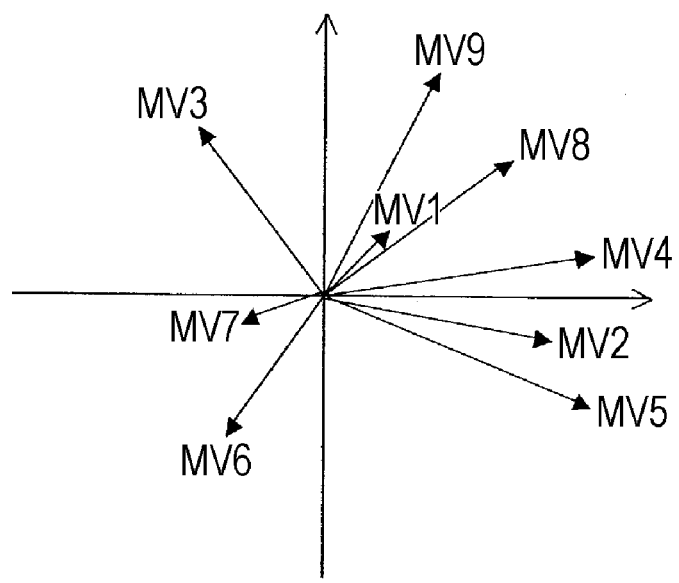
FIG. 8 is another diagram illustrating the weights of the motion vectors.

Here, the weight of the motion vector will be specifically described with reference to FIGS. 6, 7, and 8. FIG. 6 exemplarily shows MBs 1, 2, 3, 4, 5, 6, 7, 8, and 9 existing in a single frame. The motion vectors of the MBs 1 to 9 are indicated by the signs MV1, MV2, MV3, MV4, MV5, MV6, MV7, MV8, and MV9 as shown in FIG. 7. Namely, the motion vectors of the MBs 1 to 9 are indicated by the individual signs MV1 to MV9.

A predetermined numerical value indicating the length of the motion vector is set to the server 101 in advance as a threshold value. Data of a motion vector having a length, where the value of the length is larger than the threshold value, is extracted as the motion vector considered as an influential motion vector when being lost.

As a method of setting the threshold value provided as the predetermined numerical value indicating the length of the above-described motion vector to the server 101, there is a method of embedding data of the threshold value in the above-described RTSP request shown in FIG. 2 and transmitting the data from each of the clients 102 and 103 to the server 101 so that the threshold value is set to the server 101. Further, the threshold value may be set to the server 101 in advance through operations performed by a user.

Further, the lengths of the motion vectors are classified into several levels and weights may be assigned to the motion vectors based on the levels. The weight can be changed for each application and/or a user. For an application and/or a user wishing for a highly brilliant image, an adjustment can be made so that packets including the motion vectors can be retransmitted in increasing order of the importance level. Thus, a more general-purpose control can be achieved.

Another exemplary method using the motion vectors will be described. When motion vectors MV1, MV2, MV3, MV4, MV5, MV6, MV7, MV8, and MV9 that are shown in FIG. 8 occur for the individual MB1 to MB9 that are shown in FIG. 6, variations in the orientations of the motion vectors MV1 to MV9 are calculated, so as to perceive whether the orientations indicate a single direction and/or many directions. For example, if the orientations of many of the motion vectors indicate almost the same direction, the server 101 retransmits a packet including a motion vector with an orientation opposite to those of the many motion vectors. According to the exemplary method shown in FIG. 8, the motion vectors MV3, MV6, and MV7 have orientations opposite to those of many other motion vectors. Therefore, packets including the motion vectors MV3, MV6, and MV7 are retransmitted.

Further, according to another exemplary method using the motion vectors, the server 101 detects variations in the motion vectors in frames and calculates the degree of the variations. If the value of the calculated variation degree equals to a predetermined numerical value or more, the server 101 retransmits the frame corresponding to the above-described value. Otherwise, the variations may be classified into several levels and weights may be assigned to the frames based on the levels. Consequently, it becomes possible to perform a general-purpose control for each application and each user.

Next, a third embodiment of the present invention will be described. In the third embodiment, the server 101 determines important texture data in advance. If the texture data is lost, the packet including the texture data is retransmitted. The server 101 extracts texture data considered as influential data upon being lost from the texture data existing in a frame and stores the extracted texture data. From then on, information about lost data is transmitted from the client 102 to the server 101 as is the case with the first embodiment. If it is detected that a packet including the lost data is a packet including the texture data stored in advance on the server-101 side, the server 101 retransmits the packet.

Otherwise, weights may be assigned to the texture data, as is the case with the first embodiment, and if the value of the weight of the texture data corresponding to the lost packet is equal to a predetermined threshold value or more, the corresponding packet may be retransmitted.

Figure 9:
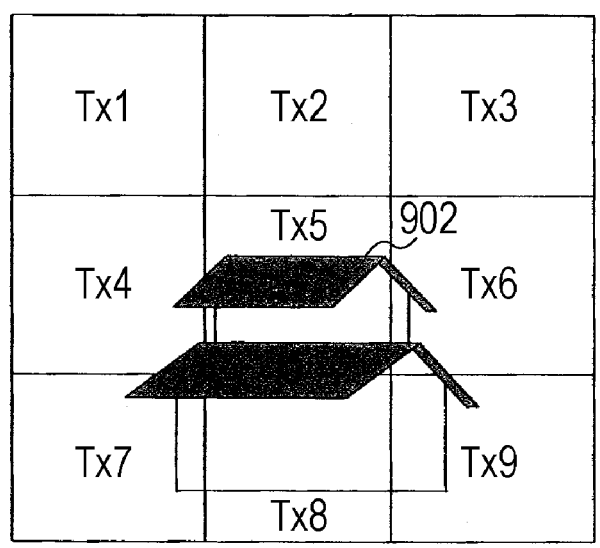
FIG. 9 is a diagram provided to specifically illustrating a method of setting the weights of texture data.

A method of setting the weight of the texture data will be specifically described. A region defined in a frame is divided into regions Tx1, Tx2, Tx3, Tx4, Tx5, Tx6, Tx7, Tx8, and Tx9 as shown in FIG. 9. The regions Tx1 to Tx9 are ranked and weights are assigned based on the ranks. Further, according to another method, an object for attention may be detected when the orientation of a camera is moved, and the weights may be classified into levels based on the distances from the center of the object. However, the classification of the weights into levels, which is achieved by the division of a region defined in the frame of image data obtained through a fixed camera, will be exemplarily described for the sake of the simplicity.

Data of regions Tx4 to Tx9 including a target object 902 as shown in FIG. 9 is determined to be the most important data. Then, settings are made so that the weight of a region is decreased as the distance between the region and the target object 902 is increased. The method of using the weights is the same as the above-described method of using the motion vectors. According to a method of setting the threshold value of the weight of the texture data to the server 101, the threshold value may be set to the server 101 based on operations performed by the user, or an RTSP request including data of the threshold value may be transmitted from each of the clients 102 and 103 to the server 101.

Next, a fourth embodiment of the present invention will be described. In the fourth embodiment, calculations are performed so as to determine in what region of each of subsequent frames a lost packet is referred to after a request for the packet retransmission is issued. If the value of the region exceeds a predetermined threshold value, the packet retransmission is performed.

On the server-101 side, it is confirmed what size a region included in the next frame has, where the region is referred to for the lost packet, based on information about the sequence number of a lost packet, the information being transmitted from each of the clients 102 and 103. In that case, encoded data is stored on the server-101 side for some time. As the region referred to for the lost packet increases, so does the weight. The weights are classified into levels based on the areas of the individual regions.

The method of setting the threshold value of the area used to determine the weight may include the method of simply using the area and the method of using the area referred to for the lost packet as a percentage of the area of the entire screen image. For example, there is a method of running tests in advance, so as to determine the visibly permissible value of disturbed video, that is, the maximum area showing visibly tolerable disturbed video and/or the maximum percentage of the entire image. When the area value exceeds the permissible value, the packet retransmission is performed. The method of setting the threshold value and transferring data of the threshold value is the same as that described above.

Next, a fifth embodiment of the present invention will be described. In the fifth embodiment, the maximum permissible number of influential frames is determined after the retransmission request is transmitted, so as to determine in how many of the subsequent frames the lost packet can disturb the video. The packet retransmission is performed only when the number of the influential frames exceeds the threshold value of the maximum permissible number.

In the fourth embodiment, the influential range of the lost packet is calculated based on the area of the next frame which is referred to. In the fifth embodiment, however, the influence of the lost packet is determined based on the number of frames which are referred to. It is checked how many of the subsequent frames are referred to for the lost packet. For example, when the threshold value is determined to be three frames and three frames or more are referred to, the packet retransmission is performed.

Next, a sixth embodiment of the present invention will be described. In the sixth embodiment, the packet retransmission is performed when it is predicted that the EC function is ineffective based on the CPU use rate of each of the clients 102 and 103 when the retransmission request is issued. For transmitting information about the CPU use rate, the information about the CPU use rate of each of the clients 102 and 103 is added and written in the expansion area of the RR packet of an RTCP response. A numerical value achieving a visual effect due to the effect of the EC function of each of the clients 102 and 103 is measured in advance for each CPU use rate.

Next, the numerical value exemplarily shown as an item which reads ec_CPU_tolerance=70 is added to the above-described parameter RTSP DESCRIBE. If the CPU-use-rate information is acquired on the server-101 side and the CPU use rate is equal to 70% or more, the packet retransmission is performed. The CPU use rate of each of the clients 102 and 103 is used as exemplary information showing the resource state of a data reception apparatus according to an embodiment of the present invention. Therefore, the resource state information that can be used for an embodiment of the present invention includes information about the use amount of a memory, a hard disk, etc., information about the flow amount of a network, and so forth.

Thus, the method of determining the effect of the EC function has been described. However, a boundary value used when the threshold values determining the effect of the EC function are set and when it is predicted that the EC function is ineffective changes due to variations among individuals and/or the objects of the system. The threshold value may be set for each system and/or the weights may be set as in the above-described embodiments. Otherwise, the threshold values and the weights may be arbitrarily set based on which of low, medium, and high levels of image quality the user desires.

Next, a seventh embodiment of the present invention will be described. In the above-described first to sixth embodiments, whether the EC function of each of the clients 102 and 103 would be effective is determined through a single determining processing. In the seventh embodiment, however, the packet retransmission is performed or not performed based on a result of multiple determinations.

For example, a method of using both the determination made based on the number of the packet losses and the weight determination made based on the motion vectors will be described. According to the above-described method, first, information about the number of the packet losses is acquired from the RR packet of the above-described RTSP response. If the packet loss number exceeds a certain set number, the packet retransmission is performed. According to the above-described determining method, however, not all of the packets are transmitted from the server 101 at the packet-retransmission time. Namely, only a packet having a threshold value no smaller than a predetermined threshold value of the weights assigned based on the motion vectors and/or the threshold value of the weight desired when each of the clients 102 and 103 accesses the server 101 is retransmitted.

In that case, not only the single determination but also the multiple determinations are made, which allows for decreasing the number of packets for retransmission. Further, the selection of important data is also performed. Therefore, it becomes possible to retransmit a packet with a heavy weight at a point where the video disturbance is significant. In that case, the recovery efficiency of a packet for retransmission becomes higher than in the case where the single determination is made.

Next, an eighth embodiment of the present invention will be described. In the above-described first to seventh embodiments, the server 101 determines whether it is predicted that the EC function of each of the clients 102 and 103 is effective. However, in the eighth embodiment, all of the above-described various determination methods are performed on the client-102 side and the client-103 side.

Figure 10:
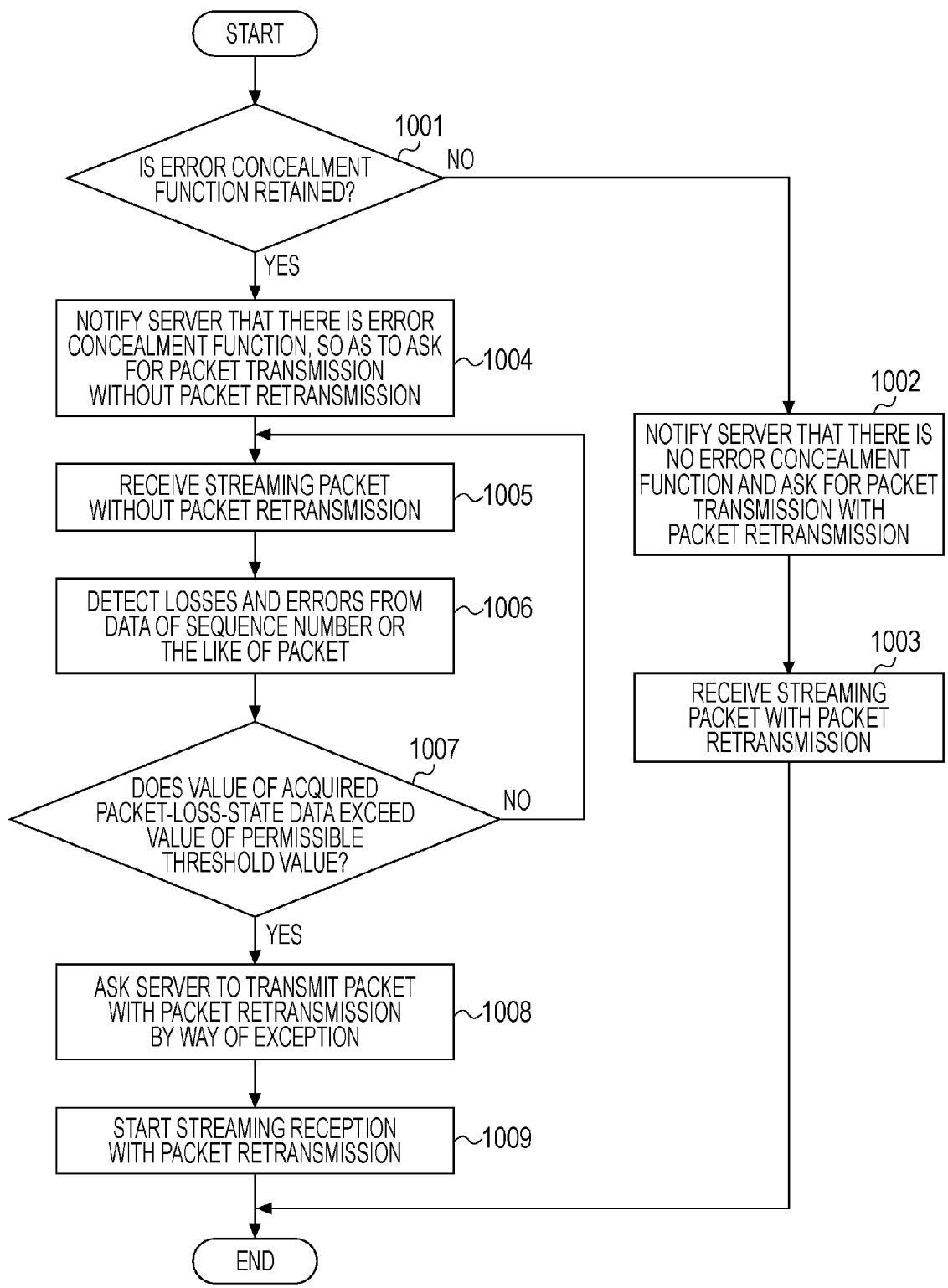
FIG. 10 is a flowchart showing the flow of operations performed by a client according to another embodiment of the present invention.

FIG. 10 is a flowchart showing the flow of operations performed by each of the clients 102 and 103 according to the eighth embodiment. In FIG. 10, first, it is confirmed whether each of the clients 102 and 103 is provided with the EC function at step S1001. If the EC function is not provided, each of the clients 102 and 103 notifies the server 101 that the EC function is not provided so that the packet retransmission is started at step S1002. The method of notifying the server 101 includes, for example, the method performed to add information indicating whether the EC function is provided to the RTSP request described in the first embodiment with reference to FIG. 2 and transmit the RTSP request. As a result, each of the clients 102 and 103 receives the video streaming with the packet retransmission at step S1003. Here, the processing performed at step S1001 is an exemplary processing performed by the determining unit of a data reception apparatus according to an embodiment of the present invention.

On the other hand, if it is determined that the EC function is provided at step S1001 performed to determine whether the EC function is provided, each of the clients 102 and 103 notifies the server 101 that the EC function is provided so that the transmission of the streaming video is started without the packet retransmission at step S1003. The above-described notification method is the same as that performed by using the above-described RTSP request. As a result of the notification, each of the clients 102 and 103 receives the streaming video without the packet retransmission at step S1005.

Then, each of the clients 102 and 103 detects a packet loss based on the sequence numbers of packets of the received streaming video at step S1006. Subsequently, each of the clients 102 and 103 determines whether the number of packets that are lost per unit time exceeds a predetermined threshold value at step S1007. The method of setting the above-described threshold value is the same as the above-described setting method. For example, tests are run in advance. Namely, the maximum visually tolerable value is calculated by generating a pseudo-error, for example, and information about the threshold value is stored on each of the client-102 side and the client-103 side. When lost packets occur, the number of packets lost per unit time is measured on each of the client-102 side and the client-103 side, and the measured packet number is compared to the stored threshold value.

Then, if the result of the above-described comparison shows that the number of the lost packets does not exceed the threshold value, each of the clients 102 and 103 continues to receive the streaming video without the packet retransmission as in the past. On the other hand, if the number of the lost packets exceeds the threshold value, each of the clients 102 and 103 requests the server 101 to transmit the streaming video with the packet retransmission at step S1008. For notifying the server 101 of the request, the expansion area of the RR packet of the RTCP request is used, as an example. Consequently, each of the clients 102 and 103 is provided with the EC function, and starts to receive the streaming video with the packet retransmission by way of exception at step S1009.

From then on, even though each of the clients 102 and 103 continues to receive the streaming video, each of the clients 102 and 103 detects the state of the packet losses on a regular basis based on the sequence numbers of packets transmitted from the server 101 and compares the number of the lost packets to the threshold value repeatedly. Thus, each of the clients 102 and 103 controls the video streaming reception based on the state of the number of the lost packets at all times. Further, each of the clients 102 and 103 generates a finish event on its own initiative, whereby the processing is finished.

Thus, in the above-described embodiments, it is determined whether the packet should be retransmitted to the transmission apparatus 101 based on the error concealment function provided for each of the reception apparatuses 102 and 103. Accordingly, it becomes possible to distribute the control loads for maintaining the quality of communication services and reduce a deterioration in the communication band, the deterioration occurring due to the packet retransmission.

Each of units and/or steps included in the above-described embodiments of the present invention can be achieved by an operating program stored in a random-access memory (RAM) and/or a read-only memory (ROM) of a computer. The program and/or a computer-readable recording medium storing the program constitutes another embodiment of the present invention.

Further, each of a system, an apparatus, a method, a program, a storage medium, etc. may constitute another embodiment of the present invention. More specifically, the present invention can be used for an apparatus including a single unit only.

Further, program code of software implementing the functions of the above-described embodiments is supplied to the system and/or the apparatus directly and/or remotely. Then, a computer of the system and/or the apparatus reads and executes the supplied program code so that the functions of the above-described embodiments can be achieved, which constitutes another embodiment of the present invention.

Therefore, the program code itself installed in the computer, so as to achieve functional processing of the present invention by the computer, also constitutes another embodiment of the present invention. Namely, a computer program itself provided to achieve the functional processing can constitute another embodiment of the present invention. In that case, the above-described computer program may be object code, a program executed by an interpreter, script data supplied to an operating system (OS), etc., so long as the computer program has program functions.

Further, not only by the computer reading and executing the read program, but also by the computer executing part of or the entire process utilizing an OS, etc. running on the computer based on instructions of the program, the functions of the above-described embodiments may be achieved.

Further, the program read from the recording medium may be written into a memory of a function-expansion board inserted into the computer and/or a function-expansion unit connected to the computer. Then, a central processing unit (CPU), etc. of the function-expansion board and/or the function-expansion unit may execute part of or the entire process based on instructions of the program so that the functions of the above-described embodiments are achieved.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2008-141082 filed on May 29, 2008, which is hereby incorporated by reference herein in its entirety.

What is claimed is:

1. A transmission apparatus transmitting data to a reception apparatus, the transmission apparatus comprising:
   a receiving unit configured to receive information indicating whether the reception apparatus has an error-concealment function; and
   a determining unit configured to determine whether unsuccessfully received data is to be retransmitted when the reception apparatus has the error-concealment function, and determine, if it is determined that the unsuccessfully received data is to be retransmitted when the reception apparatus has the error-concealment function, that the unsuccessfully received data having a priority larger than a predetermined priority is to be retransmitted.

2. The transmission apparatus according to claim 1, wherein the determining unit determines, if a number of data items unsuccessfully received during a reception exceeds a certain set number, that unsuccessfully received data is to be retransmitted when the reception apparatus has the error-concealment function.

3. The transmission apparatus according to claim 1, wherein the determining unit determines, if it is determined that the unsuccessfully received data is to be retransmitted when the reception apparatus has the error-concealment function, that the unsuccessfully received data corresponding to a portion which moves in a frame more than a predetermined distance is to be retransmitted as the data having a priority larger than a predetermined priority.

4. The transmission apparatus according to claim 1, wherein the determining unit determines, if it is determined that the unsuccessfully received data is to be retransmitted when the reception apparatus has the error-concealment function, that the unsuccessfully received data corresponding to a portion which moves in a frame to a direction different from moving directions of other portions by more than a predetermined amount is to be retransmitted as the data having a priority larger than a predetermined priority.

5. The transmission apparatus according to claim 1, wherein the determining unit determines, if it is determined that the unsuccessfully received data is to be retransmitted when the reception apparatus has the error-concealment function, that the unsuccessfully received data corresponding to a portion whose moving direction in a frame changes more than a predetermined degree of change is to be retransmitted as the data having a priority larger than a predetermined priority.

6. The transmission apparatus according to claim 1, wherein the receiving unit receives the predetermined priority from the reception apparatus.

7. A transmission method performed by a transmission apparatus transmitting data to a reception apparatus, the transmission method comprising the steps of:
   receiving information indicating whether the reception apparatus has an error-concealment function; and
   determining whether unsuccessfully received data is to be retransmitted when the reception apparatus has the error-concealment function, and determining, if it is determined that the unsuccessfully received data is to be retransmitted when the reception apparatus has error-concealment function, that the unsuccessfully received data having a priority larger than a predetermined priority is to be retransmitted.

8. The transmission method according to claim 7, wherein the determining step determines, if a number of data items unsuccessfully received during a reception exceeds a certain set number, that unsuccessfully received data is to be retransmitted when the reception apparatus has the error-concealment function.

9. The transmission method according to claim 7, wherein the determining step determines, if it is determined that the unsuccessfully received data is to be retransmitted when the reception apparatus has the error-concealment function, that the unsuccessfully received data corresponding to a portion which moves in a frame more than a predetermined distance is to be retransmitted as the data having a priority larger than a predetermined priority.

10. The transmission method according to claim 7, wherein the receiving step receives the predetermined priority from the reception apparatus.

11. A non-transitory computer-readable recording medium storing information about instructions that can be executed by a computer transmitting data to a reception apparatus, the instructions comprising:
    receiving instructions provided to receive information indicating whether the reception apparatus is provided with an error-concealment function; and determining instructions provided to determine whether unsuccessfully received data is to be retransmitted when the reception apparatus has the error-concealment function, and determine, if it is determined that the unsuccessfully received data is to be retransmitted when the reception apparatus has error-concealment function, that the unsuccessfully received data having a priority larger than a predetermined priority is to be retransmitted.

12. The computer-readable recording medium according to claim 11, the determining instructions determines, if a number of data items unsuccessfully received during a reception exceeds a certain set number, that unsuccessfully received data is to be retransmitted when the reception apparatus has the error-concealment function.

13. The computer-readable recording medium according to claim 11, the determining instructions determines, if it is determined that unsuccessfully received data is to be retransmitted when the reception apparatus has the error-concealment function, that the unsuccessfully received data corresponding to a portion which moves in a frame more than a predetermined distance is to be retransmitted as the data having a priority larger than a predetermined priority.

14. The computer-readable recording medium according to claim 11, the receiving instructions receives the predetermined priority from the reception apparatus.

* * * * *